US011571814B2

(12) United States Patent
Johnson et al.

(10) Patent No.: US 11,571,814 B2
(45) Date of Patent: Feb. 7, 2023

(54) DETERMINING HOW TO ASSEMBLE A MEAL

(71) Applicant: The Charles Stark Draper Laboratory, Inc., Cambridge, MA (US)

(72) Inventors: David M. S. Johnson, Cambridge, MA (US); Syler Wagner, Somerville, MA (US); Steven Lines, Brookline, MA (US); Mitchell Hebert, Littleton, CO (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 279 days.

(21) Appl. No.: 16/570,976

(22) Filed: Sep. 13, 2019

(65) Prior Publication Data
US 2020/0090099 A1    Mar. 19, 2020

Related U.S. Application Data

(60) Provisional application No. 62/731,398, filed on Sep. 14, 2018, provisional application No. 62/730,918, (Continued)

(51) Int. Cl.
*B25J 9/16*    (2006.01)
*B25J 13/00*    (2006.01)
(Continued)

(52) U.S. Cl.
CPC .......... *B25J 9/1666* (2013.01); *B25J 9/0009* (2013.01); *B25J 9/16* (2013.01); *B25J 9/161* (2013.01);
(Continued)

(58) Field of Classification Search
None
See application file for complete search history.

(56) References Cited

U.S. PATENT DOCUMENTS

| 4,512,709 A | 4/1985 | Hennekes |
| 4,513,709 A | 4/1985 | Hennekes |

(Continued)

FOREIGN PATENT DOCUMENTS

| CN | 106313068 A | 1/2017 |
| CN | 107092209 A | 8/2017 |

(Continued)

OTHER PUBLICATIONS

Langsfeld, Joshua D..; "Learning Task Models for Robotic Manipulation of Nonrigid Objects"; University of Maryland, College Park. ProQuest Dissertations Publishing, 2017. 10255938. (Year: 2017).*

(Continued)

*Primary Examiner* — Leland Marcus
(74) *Attorney, Agent, or Firm* — Hamilton, Brook, Smith & Reynolds, P.C.

(57) ABSTRACT

In an embodiment, a method includes determining a given material to manipulate to achieve a goal state. The goal state can be one or more deformable or granular materials in a particular arrangement. The method further includes, for the given material, determining, a respective outcome for each of a plurality of candidate actions to manipulate the given material. The determining can be performed with a physics-based model, in one embodiment. The method further can include determining a given action of the candidate actions, where the outcome of the given action reaching the goal state is within at least one tolerance. The method further includes, based on a selected action of the given actions, generating a first motion plan for the selected action.

14 Claims, 6 Drawing Sheets

Related U.S. Application Data filed on Sep. 13, 2018, provisional application No. 62/730,703, filed on Sep. 13, 2018, provisional application No. 62/730,934, filed on Sep. 13, 2018, provisional application No. 62/730,947, filed on Sep. 13, 2018, provisional application No. 62/730,933, filed on Sep. 13, 2018.

(51) Int. Cl.

| | |
|---|---|
| B25J 13/08 | (2006.01) |
| G06N 3/08 | (2006.01) |
| G10L 15/22 | (2006.01) |
| B65G 1/137 | (2006.01) |
| B25J 9/00 | (2006.01) |
| B25J 15/00 | (2006.01) |
| G06Q 10/06 | (2012.01) |
| B25J 11/00 | (2006.01) |
| B25J 15/04 | (2006.01) |
| B25J 19/02 | (2006.01) |
| G05D 1/02 | (2020.01) |
| B25J 19/00 | (2006.01) |
| G06V 40/20 | (2022.01) |
| H04L 67/12 | (2022.01) |
| G05B 19/4061 | (2006.01) |
| A47J 44/00 | (2006.01) |

(52) U.S. Cl.
CPC ........... *B25J 9/1633* (2013.01); *B25J 9/1653* (2013.01); *B25J 9/1664* (2013.01); *B25J 9/1674* (2013.01); *B25J 9/1676* (2013.01); *B25J 9/1682* (2013.01); *B25J 9/1687* (2013.01); *B25J 9/1697* (2013.01); *B25J 11/0045* (2013.01); *B25J 13/003* (2013.01); *B25J 13/085* (2013.01); *B25J 13/088* (2013.01); *B25J 15/0052* (2013.01); *B25J 15/0408* (2013.01); *B25J 19/0083* (2013.01); *B25J 19/023* (2013.01); *B65G 1/137* (2013.01); *G05D 1/02* (2013.01); *G06N 3/08* (2013.01); *G06Q 10/06316* (2013.01); *G06V 40/28* (2022.01); *G10L 15/22* (2013.01); *A47J 44/00* (2013.01); *G05B 19/4061* (2013.01); *G05B 2219/32335* (2013.01); *G05B 2219/39001* (2013.01); *G05B 2219/39091* (2013.01); *G05B 2219/39319* (2013.01); *G05B 2219/39342* (2013.01); *G05B 2219/39468* (2013.01); *G05B 2219/40201* (2013.01); *G05B 2219/40202* (2013.01); *G05B 2219/40411* (2013.01); *G05B 2219/40497* (2013.01); *G05B 2219/45111* (2013.01); *G05B 2219/49157* (2013.01); *G05B 2219/50391* (2013.01); *H04L 67/12* (2013.01)

(56) References Cited

U.S. PATENT DOCUMENTS

| | | |
|---|---|---|
| 4,604,787 A | 8/1986 | Silvers |
| 4,611,377 A | 9/1986 | McCormick |
| 4,624,043 A | 11/1986 | Bennett |
| 4,676,142 A | 6/1987 | McCormick |
| 4,875,275 A | 10/1989 | Hutchinson et al. |
| 4,896,357 A | 1/1990 | Hatano |
| 4,904,514 A | 2/1990 | Morrison et al. |
| 5,018,266 A | 5/1991 | Hutchinson et al. |
| 5,044,063 A | 9/1991 | Voellmer |
| 5,131,706 A | 7/1992 | Appleberry |
| 5,136,223 A | 8/1992 | Karakama |
| 5,360,249 A | 11/1994 | Monforte et al. |
| 5,396,346 A | 3/1995 | Nakayama |
| 5,774,841 A | 6/1998 | Salazar et al. |
| 5,879,277 A | 3/1999 | Dettman et al. |
| 6,223,110 B1 * | 4/2001 | Rowe ................ E02F 9/2045 37/234 |
| 6,427,995 B1 | 8/2002 | Steinwall |
| 6,569,070 B1 | 5/2003 | Harrington et al. |
| 6,678,572 B1 | 1/2004 | Oh |
| 8,095,237 B2 | 1/2012 | Habibi et al. |
| 9,186,795 B1 | 11/2015 | Edsinger et al. |
| 9,189,742 B2 | 11/2015 | London |
| 9,259,840 B1 | 2/2016 | Chen |
| 9,346,164 B1 | 5/2016 | Edsinger et al. |
| 9,427,876 B2 | 8/2016 | Mozeika et al. |
| 9,615,066 B1 | 4/2017 | Tran et al. |
| 9,621,984 B1 | 4/2017 | Chu |
| 9,659,225 B2 | 5/2017 | Joshi et al. |
| 9,744,668 B1 | 8/2017 | Russell et al. |
| 9,547,306 B2 | 10/2017 | Sepulveda |
| 9,800,973 B1 | 10/2017 | Chatot et al. |
| 9,801,517 B2 | 10/2017 | High et al. |
| 10,131,053 B1 | 11/2018 | Sampedro et al. |
| 10,427,306 B1 | 10/2019 | Quinlan et al. |
| 11,016,491 B1 | 5/2021 | Millard |
| 11,116,593 B2 | 9/2021 | Hashimoto et al. |
| 11,351,673 B2 | 6/2022 | Zito et al. |
| 2002/0144565 A1 | 10/2002 | Ambrose |
| 2002/0151848 A1 | 10/2002 | Capote et al. |
| 2002/0158599 A1 | 10/2002 | Fujita |
| 2002/0181773 A1 | 12/2002 | Higaki et al. |
| 2003/0060930 A1 | 3/2003 | Fujita |
| 2004/0039483 A1 | 2/2004 | Kemp et al. |
| 2004/0172380 A1 * | 9/2004 | Zhang ................ B25J 9/1682 |
| 2005/0004710 A1 | 1/2005 | Shimomura et al. |
| 2005/0171643 A1 | 8/2005 | Sabe et al. |
| 2005/0193901 A1 * | 9/2005 | Buehler ................ A47J 44/00 99/468 |
| 2005/0283475 A1 | 12/2005 | Beranik |
| 2006/0137164 A1 | 6/2006 | Kraus |
| 2006/0141200 A1 | 6/2006 | D'Amdreta |
| 2006/0165953 A1 | 7/2006 | Castelli |
| 2007/0233321 A1 | 10/2007 | Suzuki |
| 2007/0274812 A1 | 11/2007 | Ban et al. |
| 2007/0276539 A1 | 11/2007 | Habibi et al. |
| 2008/0059178 A1 | 3/2008 | Yamamoto et al. |
| 2008/0161970 A1 | 7/2008 | Adachi et al. |
| 2008/0177421 A1 | 7/2008 | Cheng et al. |
| 2008/0201016 A1 | 8/2008 | Finlay |
| 2008/0237921 A1 | 10/2008 | Butterworth |
| 2009/0075796 A1 | 3/2009 | Doll |
| 2009/0292298 A1 | 11/2009 | Lin et al. |
| 2010/0114371 A1 | 5/2010 | Tsusaka et al. |
| 2010/0292707 A1 | 11/2010 | Ortmaier |
| 2011/0060462 A1 | 3/2011 | Aurnhammer et al. |
| 2011/0125504 A1 | 5/2011 | Ko et al. |
| 2011/0238212 A1 | 9/2011 | Shirado et al. |
| 2011/0256995 A1 | 10/2011 | Takazakura et al. |
| 2012/0016678 A1 | 1/2012 | Gruber |
| 2012/0255388 A1 | 10/2012 | McClosky |
| 2012/0290134 A1 | 11/2012 | Zhao |
| 2013/0079930 A1 | 3/2013 | Mistry |
| 2013/0103198 A1 | 4/2013 | Nakamoto et al. |
| 2013/0103918 A1 | 4/2013 | Dictos |
| 2014/0067121 A1 | 3/2014 | Brooks |
| 2014/0163736 A1 | 6/2014 | Azizian et al. |
| 2014/0316636 A1 | 10/2014 | Hong et al. |
| 2015/0032260 A1 | 1/2015 | Yoon et al. |
| 2015/0051734 A1 | 2/2015 | Zheng |
| 2015/0052703 A1 | 2/2015 | Lee et al. |
| 2015/0114236 A1 * | 4/2015 | Roy .................. A47J 44/00 901/41 |
| 2015/0117156 A1 | 4/2015 | Xu et al. |
| 2015/0148953 A1 | 5/2015 | Laurent et al. |
| 2015/0149175 A1 | 5/2015 | Hirata et al. |
| 2015/0178953 A1 | 5/2015 | Laurent |
| 2015/0277430 A1 | 10/2015 | Linnell et al. |
| 2015/0375402 A1 | 12/2015 | D Andreta |
| 2016/0016315 A1 | 1/2016 | Kuffner et al. |
| 2016/0073644 A1 | 3/2016 | Dickey |
| 2016/0075023 A1 | 3/2016 | Sisbot |

(56) References Cited

U.S. PATENT DOCUMENTS

| | | |
|---|---|---|
| 2016/0103202 A1 | 4/2016 | Sumiyoshi et al. |
| 2016/0291571 A1 | 10/2016 | Cristiano |
| 2016/0372138 A1 | 12/2016 | Shinkai et al. |
| 2017/0004406 A1 | 1/2017 | Aghamohammadi |
| 2017/0080565 A1 | 3/2017 | Dalibard |
| 2017/0087722 A1 | 3/2017 | Aberg et al. |
| 2017/0133009 A1 | 5/2017 | Cho et al. |
| 2017/0168488 A1 | 6/2017 | Wierzynski |
| 2017/0326728 A1 | 11/2017 | Prats |
| 2017/0334066 A1 | 11/2017 | Levine |
| 2017/0354294 A1* | 12/2017 | Shivaiah ............... A47J 36/321 |
| 2017/0361461 A1 | 12/2017 | Tan |
| 2017/0361468 A1 | 12/2017 | Cheuvront et al. |
| 2018/0043952 A1 | 2/2018 | Ellerman et al. |
| 2018/0056520 A1 | 3/2018 | Ozaki |
| 2018/0070776 A1 | 3/2018 | Ganninger |
| 2018/0121994 A1 | 5/2018 | Matsunaga et al. |
| 2018/0144244 A1 | 5/2018 | Masoud et al. |
| 2018/0147718 A1 | 5/2018 | Oleynik |
| 2018/0147723 A1 | 5/2018 | Vijayanarasimhan |
| 2018/0150661 A1 | 5/2018 | Hall et al. |
| 2018/0200014 A1 | 7/2018 | Bonny et al. |
| 2018/0200885 A1 | 7/2018 | Ikeda et al. |
| 2018/0202819 A1 | 7/2018 | Mital |
| 2018/0214221 A1 | 8/2018 | Crawford et al. |
| 2018/0257221 A1 | 9/2018 | Toothaker et al. |
| 2018/0275632 A1 | 9/2018 | Zhang et al. |
| 2018/0338504 A1 | 11/2018 | Lavri et al. |
| 2018/0345479 A1 | 12/2018 | Martino et al. |
| 2018/0348783 A1 | 12/2018 | Pitzer et al. |
| 2018/0354140 A1 | 12/2018 | Watanabe |
| 2019/0001489 A1 | 1/2019 | Hudson et al. |
| 2019/0039241 A1 | 2/2019 | Langenfeld et al. |
| 2019/0049970 A1 | 2/2019 | Djuric et al. |
| 2019/0056751 A1* | 2/2019 | Ferguson ............. G06Q 10/083 |
| 2019/0066680 A1 | 2/2019 | Woo et al. |
| 2019/0212441 A1 | 7/2019 | Casner et al. |
| 2019/0291277 A1 | 9/2019 | Oleynik |
| 2019/0310611 A1 | 10/2019 | Jain |
| 2019/0321989 A1 | 10/2019 | Anderson et al. |
| 2019/0381617 A1 | 12/2019 | Patrini et al. |
| 2020/0023520 A1 | 1/2020 | Yoshizumi |
| 2020/0030966 A1 | 1/2020 | Hasegawa |
| 2020/0047349 A1 | 2/2020 | Sinnet et al. |
| 2020/0070355 A1 | 3/2020 | Neumann et al. |
| 2020/0073358 A1 | 3/2020 | Dedkov et al. |
| 2020/0073367 A1 | 3/2020 | Nguyen et al. |
| 2020/0086437 A1 | 3/2020 | Johnson |
| 2020/0086482 A1 | 3/2020 | Johnson |
| 2020/0086485 A1 | 3/2020 | Johnson |
| 2020/0086487 A1 | 3/2020 | Johnson |
| 2020/0086497 A1 | 3/2020 | Johnson |
| 2020/0086498 A1 | 3/2020 | Johnson |
| 2020/0086502 A1 | 3/2020 | Johnson |
| 2020/0086503 A1 | 3/2020 | Johnson |
| 2020/0086509 A1 | 3/2020 | Johnson |
| 2020/0087069 A1 | 3/2020 | Johnson |
| 2020/0298403 A1 | 9/2020 | Nilsson et al. |
| 2022/0066456 A1 | 3/2022 | Ebrahimi et al. |

FOREIGN PATENT DOCUMENTS

| | | |
|---|---|---|
| DE | 3723329 A | 1/1988 |
| DE | 3823102 A1 | 1/1990 |
| EP | 138461 A2 | 4/1985 |
| EP | 474881 A1 | 3/1992 |
| EP | 1145804 A1 | 10/2001 |
| EP | 2011610 A2 | 1/2019 |
| FR | 3015334 A1 | 6/2015 |
| GB | 2550396 A | 11/2017 |
| JP | 2004295620 | 10/2004 |
| JP | 200849462 A | 3/2008 |
| JP | 2020028957 | 2/2020 |
| WO | 99/03653 A1 | 1/1999 |
| WO | 2005072917 A1 | 11/2005 |
| WO | 2009045827 A2 | 4/2009 |
| WO | 20150117156 A | 8/2015 |
| WO | 20170197170 A1 | 11/2017 |
| WO | 20180133861 A1 | 7/2018 |
| WO | 2020056279 A1 | 3/2020 |
| WO | 2020056295 A1 | 3/2020 |
| WO | 2020056301 A1 | 3/2020 |
| WO | 2020056353 A1 | 3/2020 |
| WO | 2020056362 A1 | 3/2020 |
| WO | 2020056373 A1 | 3/2020 |
| WO | 2020056374 A1 | 3/2020 |
| WO | 2020056375 A1 | 3/2020 |
| WO | 2020056376 A1 | 3/2020 |
| WO | 2020056377 A1 | 3/2020 |
| WO | 2020056380 A1 | 3/2020 |

OTHER PUBLICATIONS

Charabaruk, Nicholas; "Development of an Autonomous Omnidirectional Hazardous Material Handling Robot"; . University of Ontario Institute of Technology (Canada). ProQuest Dissertations Publishing, 2015. 10006730. (Year: 2015).*

Yang et al., "Obstacle Avoidance through Deep Networks based Intermediate Perception", Apr. 27, 2017, The Robotics Instiute, Carnegie Mellon University (Year: 2017).

Anandan, T.M., "The Shrinking Footprint of Robot Safety", Robotics Online, Oct. 6, 2014. https://www.robotics.org/content-detail.cfm/Industrial-Robotics-Industry-Insights/The-Shrinking-Footprint-of-Robot-Safety/content_id/5059.

Blutinger, J., et al., "Scoop: Automating the Ice Cream Scooping Process", Introduction to Robotics MECE E4602, Group 8 Final Project, Dec. 2016.

Bollini, M., et al., "Interpreting and Executing Recipes with a Cooking Robot", Experimental Robotics, 2013.

Dao, Z., et al. "Realtime Multi-Person 2D Pose Estimation using Part Affinity Fields", Proceedings of the IEEE Conference on Computer Vision and Pattern Recognition. 2017.

Dantam, N.T., et al. "Incremental Task and Motion Planning A Constraint-Based Approach", Robotics: Science and Systems 12, 00052, 2016.

Ferrer-Mestres, J., et al., "Combined Task and Motion Planning as a Classical AI Planning" arXiv preprint arXiv:1706 06927, 2017—arxiv.org; Jun. 21, 2017.

Kaelbling, L.P, et al., "Integrated task and motion planning in beliefs space" The International Journal of Robotics Research; 0(0) 1-34; 2013.

Martinez, J., et al., "On human motion prediction using recurrent neural networks." Proceedings of the IEEE Conference on Computer Vision and Pattern Recognition. 2017.

Nedunuri, S., et al., "SMT-Based Synthesis of Integrated Task and Motion Plan from Plan Outlines"; the Proceedings of the 2014 IEEE Intl. Conf. on Robotics and Automation (ICRA2014).

Saxena, A., et al., "RoboBrain: Large-Scale Knowledge Engine for Robots", arXiv preprint arXiv:1412.0691 (2014).

Schenck, C., et al., "Learning Robotic Manipulation of Granular Media", 1st Conference on Robot Learning, arXiv:1709.02833, Oct. 25, 2017.

Srivastava, S., et al. "Combined Task and Motion Planning Through an Extensible Planner-Independent Interface Layer"; 2014 IEEE international conference on robotics and automation (ICRA), 639-646.

Shimizu, T. and Kubota, T., "Advanced Sampling Scheme Based on Environmental Stiffness for a Smart Manipulator", Robot Intelligence Technology and Applications, pp. 19-208. 2012.

Stentz, A., et al., "A Robotic Excavator for Autonomous Truck Loading", In Proceedings of the IEEE/RSJ International Conference on Intelligent Robotic Systems, 1998.

Villegas, et al., "Learning to Generate Long-term Future via Hierarchical Prediction", In Proceedings of the 34th International Conference on Machine Learning (ICML), 2017.

Walker, J., et al., "The pose knows: Video forecasting by generating pose futures", In The IEEE International Conference on Computer Vision (ICCV), Oct. 2017.

(56) References Cited

OTHER PUBLICATIONS

Watson, J,. Kevin, et al. "Use of Voice Recognition for Control of a Robotic Welding Workcell", IEEE Control Systems Magazine; p. 16-18; (ISSN 0272-1708); 7 , Jun. 1, 1987.
Wong, J.M., et al., "SegICP-DSR: Dense Semantic Scene Reconstruction and Registration", Draper, arXiv:1711.02216; Nov. 6, 2017.
Wong, J.M., et al., "SegICP: Integrated Deep Semantic Segmentation and Pose Estimation", Massachusetts Institute of Technology, 2017 IEEE/RSJ International Conference on Intelligent Robots and Systems (IROS); Sep. 5, 2017.
Wu, J., et al., "Real-Time Object Pose Estimation with Pose Interpreter Networks", IEEE/RSJ International Conference on Intelligent Robots and Systems (IROS), 2018.
Ye, G., et al., "Demonstration-Guided Motion Planning" Robotics Research. Springer Tracts in Advanced Robotics, vol. 100, 2017.
International Search Report and Written Opinion for PCT/US2019/051148 dated Dec. 12, 2019 entitled "Food-Safe, Washable, Thermally-Conductive Robot Cover".
Anonymous: "Pate a pizza fine—Notre recette avec photos—Meilleur du Chef," Retrieved from the Internet: URL: https://www.meilleurduchef.com/fr/recette/pate-pizza-fine.html# [retrieved on Dec. 5, 2019].
International Search Report and Written Opinion for PCT/US2019/051176 dated Dec. 12, 2019 entitled "Determining How to Assemble a Meal".
International Search Report and Written Opinion for PCT/US2019/051175 dated Jan. 3, 2020 entitled Stopping Robot Motion Based on Sound Cues .
Dexai Robotics: "Alfred Sous-Chef scooping ice-cream" Youtube, retrieved from Internet Jun. 8, 2018. https://www.youtube com/watch?v=caNG4qrZhRU.
International Search Report and Written Opinion for PCT/US2019/051179 dated Jan. 9, 2020 entitled "An Adaptor for Food-Safe, Bin-Compatible, Washable, Tool-Changer Utensils".
International Search Report and Written Opinion for PCT/US2019/051177 dated Jan. 9, 2020 entitled "Voice Modification to Robot Motion Plans".
International Search Report and Written Opinion for PCT/US2019/051067 dated Jan. 16, 2020 entitled "Robot Interaction With Human Co-Workers".
International Search Report and Written Opinion for PCT/US2019/051067 dated Jan. 16, 2020 entitled "Robot nteraction With Human Co-Workers".
International Search Report and Written Opinion for PCT/US2019/051161 dated Jan. 15, 2020 entitled "Food-Safe, Washable Interface for Exchanging Tools".
ATI Industrial Automation: Automatic/RoboticTool Changers, "Automatic/RoboticTool Changes", Tool Changer News. Downloaded from Internet Feb. 4, 2020. https://www.ati-ia.com/products/toolchanger/robot_tool_changer.aspx.
Dexai Robotics: "A Robot Company is Born", retrieved from Internet from Feb. 5, 2020. https://draper.com/dexai-robotics.
Draper—"A 'Preceptive Robot' Earns Draper Spots as KUKA Innovation Award Finalist" Aug. 30, 2017, retrieved from Internet from Feb. 5, 2020. https://www.draper.com/news-releases/perceptive-robot-earns-draper-spot-kuka-innovation-award-finalist.
"Draper Spins Out Dexai Robotics", Mar. 21, 2019, retrieved from Internet from Feb. 5, 2020. https://www.draper.com/news-releases/draper-spins-out-dexai-robotics.
Dynamic Robotic Manipulation—KUKA Innovation—Finalist Spotlight—Apr. 26, 2018 retrieved from Internet Feb. 6, 2020. https://youtube.com/watch?v=7wGc-4uqOKw.
Siciliano, B., et al. "Chapter 8—Motion Control—Robotics Modelling Planning and Control", In: Robotics Modelling Planning and Control, Dec. 23, 2009.
Siciliano, B., et al. "Chapter 9—Force Control—Robotics Modelling Planning and Control", In: Robotics Modelling Planning and Control, Dec. 23, 2009.
International Search Report and Written Opinion for PCT/US2019/051040 dated Feb. 7, 2020 entitled "Manipulating Fracturable and Deformable Materials Using Articulated Manipulators".
International Search Report and Written Opinion for PCT/US2019/051180 dated Jan. 31, 2020 entitled "One-Click Robot Order".
International Search Report and Written Opinion for PCT/US2019/051061 dated Apr. 3, 2020 titled "Controlling Robot Torque and Velocity Based on Context".
Olin College of Engineering, "Autonomous Tool Changer" Draper 2016-2017, retrieved from Internet Feb. 5, 2020. http://www.olin.edu/sites/default/files/draperarchival2.pdf.
Olin College of Engineering, Autonomous Tool Changer, MoMap and the Future, "How Can We Enable a Robotic Arm to Change and Use Human Tools Autonomously". Date unknown.
International Search Report and Written Opinion for PCT/US2019/051183 dated Jan. 14, 2020 entitled "Locating and Attaching Interchangeable Tools In-Situ".
Feddema, John T., et al., Model-Based Visual Feedback Control for a Hand-Eye Coordinated Robotic System, Aug. 1992, IEEE, vol. 25, Issue: 8, pp. 21-31 (Year: 1992).

\* cited by examiner

DETERMINING HOW TO ASSEMBLE A MEAL

RELATED APPLICATIONS

This application claims the benefit of U.S. Provisional Application No. 62/730,918, filed on Sep. 13, 2018, U.S. Provisional Application No. 62/730,934, filed on Sep. 13, 2018, U.S. Provisional Application No. 62/731,398, filed on Sep. 14, 2018, U.S. Provisional Application No. 62/730,703, filed on Sep. 13, 2018, U.S. Provisional Application No. 62/730,947, filed on Sep. 13, 2018, U.S. Provisional Application No. 62/730,933, filed on Sep. 13, 2018.

This application is related to U.S. patent application Ser. No. 16/570,100, U.S. patent application Ser. No. 16/570,855, U.S. patent application Ser. No. 16/570,955, U.S. patent application Ser. No. 16/571,003, U.S. patent application Ser. No. 16/570,915, U.S. patent application Ser. No. 16/570,736, U.S. patent application Ser. No. 16/571,025, U.S. patent application Ser. No. 16/570,606, U.S. patent application Ser. No. 16/571,040, and U.S. patent application Ser. No. 16/571,041, all filed on the same day, Sep. 13, 2019.

The entire teachings of the above applications are incorporated herein by reference.

BACKGROUND

Traditionally, the food industry employs human labor to manipulate ingredients with the purpose of either assembling a meal such as a salad or a bowl, or packing a box of ingredients such as those used in grocery shopping, or preparing the raw ingredients. Robots have not yet been able to assemble complete meals from prepared ingredients in a food-service setting such as a restaurant, largely because the ingredients are arranged unpredictably and change shape in difficult-to-predict ways rendering traditional methods to move material ineffective without extensive modifications to existing kitchens. Additionally, traditional material handling methods are ill-suited to moving cooked foods without altering their texture and taste-profile. These difficulties arise because the friction, stiction, and viscosity of commonly consumed foods cause auger, conveyor, and suction mechanisms to become clogged and soiled, while these mechanisms simultaneously impart forces on the foodstuffs which alter their texture, consistency, and taste-profile in unappetizing ways.

SUMMARY

In embodiments, the below disclosure solves problems in relation to employing robotics in the quick service fast food restaurant environment. In restaurants, orders are increasingly directly entered on a tablet or other digital device; if not directly entered digitally, they are often translated from paper into a central system at a kiosk. This digital order information encodes a specific set of recipes to be prepared for a customer, along with any modifications, changes, requested or allowed ingredient substitutions, and food allergies. This information, paired with the ingredients and instructions for each recipe, is a complete description of the order to be prepared.

This disclosure describes a system consisting of at least one sensor which can observe the available ingredients required for each recipe, a manipulator which is able to accept motion plans to manipulate the ingredients, possibly a movable intermediate container for mixing ingredients, and a final container (e.g., plate, bowl, to-go container) for depositing the ingredients. Given an input recipe with modifications, the system iteratively determines the order of ingredients and then the specific set of motions and actions required to prepare the recipe.

The system contains a set of rules and relations, which may have been learned, about the order in which ingredients can be installed in order to assemble the recipe. This plan for assembly of a recipe may contain a sequential, time-ordered, series of position, torque, or control commands to be executed at specific times. The plan may command actions from multiple robots, actuatable devices such as valves or switches, and smart kitchen equipment such as grills, deep fryers, and ovens. The plan may also include sending status messages such as tweets or mobile device notifications to alert customers or staff that a recipe assembly has begun, is in progress, has an issue requiring input, or has been complete.

The plan may also consist of a set of rules, controllers, or policies which are used to instruct the food preparation system on how to react to different environmental conditions in order to successfully assembly the recipe. In an embodiment, the system synthesizes a series of closed- or open-loop control policies, as opposed to a time-series of joint positions or torques, for at least one of the actions needed to assemble the recipe. A control policy may be executed on the robot causing it to assemble a portion of the recipe, in a manner similar to replaying a time-series of joint position commands, but in a fashion which is robust to changes in the external environment. A person having ordinary skill in the art can recognize that other embodiments may employ time-series of joint positions or torques to execute the actions for assembling the recipe.

In an embodiment, a method includes determining a given material to manipulate to achieve a goal state. The goal state can be one or more deformable or granular materials in a particular arrangement. The method further includes, for the given material, determining, a respective outcome for each of a plurality of candidate actions to manipulate the given material. The determining can be performed with a physics-based model, in one embodiment. The method further can include determining a given action of the candidate actions, where the outcome of the given action reaching the goal state is within at least one tolerance. The method further includes, based on a selected action of the given actions, generating a first motion plan for the selected action.

In an embodiment, the method further includes creating a new goal state having the given material manipulated. The method further includes determining a new given material to manipulate to achieve a new goal state. The new goal state is one or more deformable or granular materials including the given material in a particular arrangement. The method further includes, for the new given material, simulating an outcome for each of a plurality of new candidate actions to manipulate the new given material. The method further includes determining a new given action of the new candidate actions, the outcome of the new given action reaching the new goal state within a tolerance. The method further includes, based on a new selected action, generating a second motion plan for the new selected action.

The goal state or new goal state can be a density distribution of different materials, a desired surface for each material, a desired center of mass for the material distribution, or a volume distribution. The goal state or new goal state may be a probability distribution of any of the previous goals.

In an embodiment, choosing the new action can be based on a criterion including the shortest path, closest to goal state, least effort, least change of spilling, least torque, or largest clearance from obstacles.

In an embodiment, the method includes ordering, for execution, the first motion plan and second motion plan based on one or more rules. The rules include material-based rules, ease of assembly rules, and parallelization rules, said ordering resulting in an order. The ease of assembly rules can further be motion plan criteria.

In an embodiment, the method includes executing the first motion plan and second motion plan in the order using one or more autonomous robots. A first autonomous robot of the one or more autonomous robots can execute the first motion plan and a second autonomous robot of the one or more autonomous robots can execute the second motion plan. The ordering can be based on instructions of ingredients or actions, a set of material rules, predicted based on a physics-based model, and a heuristic.

In an embodiment, determining a given action of the candidate actions can include adding the given material to the goal state, removing a given material from an existing state, and performing a process step to the given material and one or more other materials. A person having ordinary skill in the art can recognize that removing the given material from the existing state, for example, means the new goal state has a lower quantity of the given material.

In an embodiment, a system includes a processor and a memory with computer code instructions stored thereon. The processor and the memory, with the computer code instructions, are configured to cause the system to determine a given material to manipulate to achieve a goal state, the goal state being one or more deformable or granular materials in a particular arrangement. The computer code instructions are further configured to cause the system to, for the given material, determine, with a physics-based model, a respective outcome for each of a plurality of candidate actions to manipulate the given material. The computer code instructions are further configured to cause the system to determine a given action of the candidate actions, the outcome of the given action reaching the goal state within at least one tolerance. The computer code instructions are further configured to cause the system to, based on a selected action of the given one or more actions, generate a first motion plan for the selected action.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Operating a robot in a food preparation environment, such as a quick service restaurant, can be challenging for several reasons. First, the end effectors (e.g., utensils), that the robot uses need to remain clean from contamination. Contamination can include allergens (e.g., peanuts), dietary preferences (e.g., contamination from pork for a vegetarian or kosher customer), dirt/bacteria/viruses, or other non-ingestible materials (e.g., oil, plastic, or particles from the robot itself). Second, the robot should be operated within its design specifications, and not exposed to excessive temperatures or incompatible liquids, without sacrificing cleanliness. Third, the robot should be able to manipulate food stuffs, which are often fracturable and deformable materials, and further the robot must be able to measure an amount of material controlled by its utensil in order to dispense specific portions. Fourth, the robot should be able to automatically and seamlessly switch utensils (e.g., switch between a ladle and salad tongs). Fifth, the utensils should be adapted to be left in an assigned food container and interchanged with the robot as needed, in situ. Sixth, the interchangeable parts (e.g., utensils) should be washable and dishwasher safe. Seventh, the robot should be able to autonomously generate a task plan and motion plan(s) to assemble all ingredients in a recipe, and execute that plan. Eighth, the robot should be able to modify or stop a motion plan based on detected interference or voice commands to stop or modify the robot's plan. Ninth, the robot should be able to minimize the applied torque based on safety requirements or the task context or the task parameters (e.g., density and viscosity) of the material to be gathered. Tenth, the system should be able to receive an electronic order from a user, assemble the meal for the user, and place the meal for the user in a designated area for pickup automatically with minimal human involvement.

Figure 1:
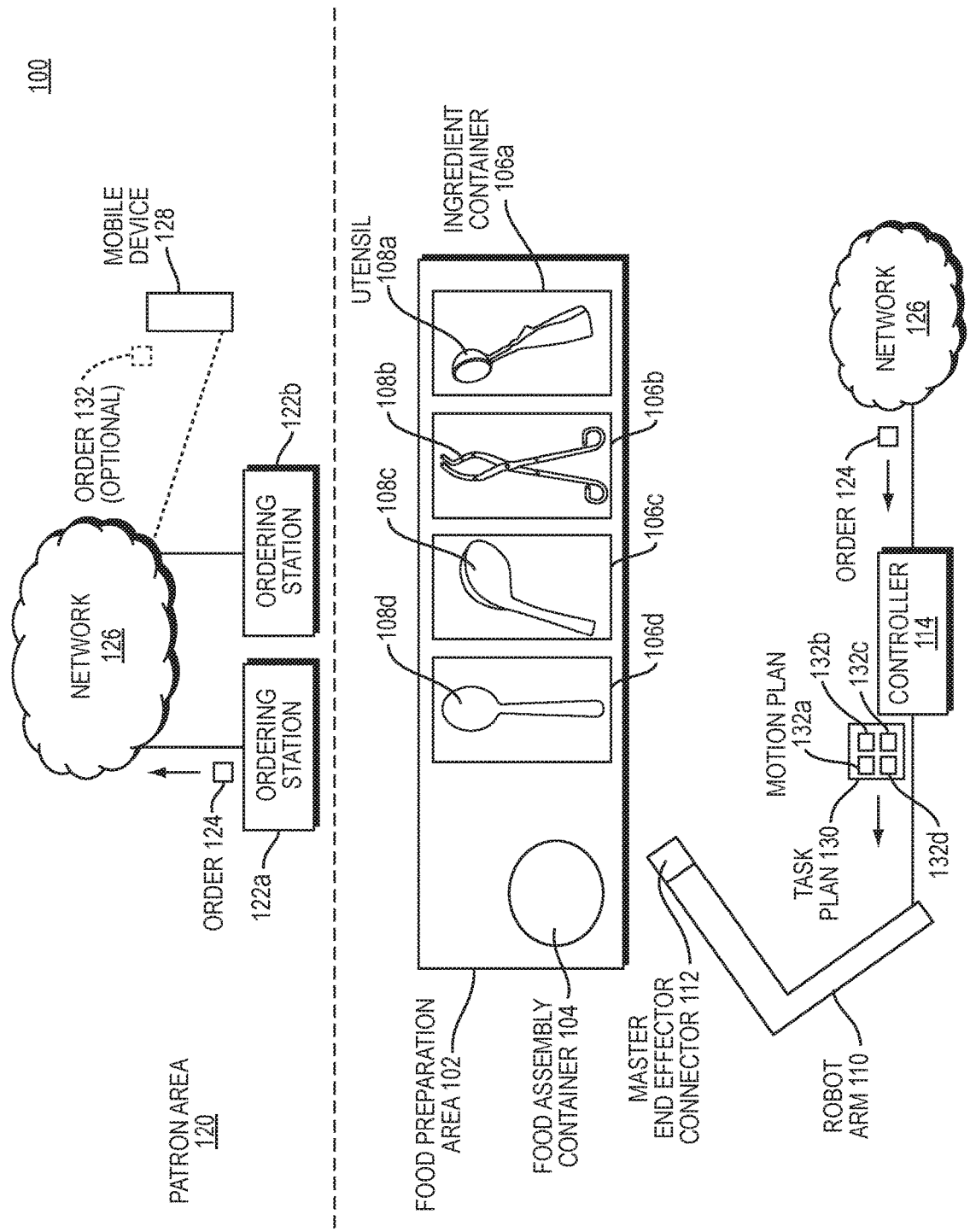
FIG. 1 is a block diagram illustrating an example embodiment of a quick service food environment of embodiments of the present invention.

FIG. 1 is a block diagram illustrating an example embodiment of a quick service food environment 100 of embodiments of the present disclosure. The quick service food environment 100 includes a food preparation area 102 and a patron area 120.

The food preparation area 102 includes a plurality of ingredient containers 106a-d each having a particular foodstuff (e.g., lettuce, chicken, cheese, tortilla chips, guacamole, beans, rice, various sauces or dressings, etc.). Each ingredient container 106a-d stores in situ its corresponding ingredients. Utensils 108a-d may be stored in situ in the ingredient containers or in a stand-alone tool rack 109. The utensils 108a-d can be spoons, ladles, tongs, dishers (scoopers), spatulas, or other utensils. Each utensil 108a-e is configured to mate with and disconnect from a tool changer interface 112 of a robot arm 110. While the term utensil is used throughout this application, a person having ordinary skill in the art can recognize that the principles described in relation to utensils can apply in general to end effectors in other contexts (e.g., end effectors for moving fracturable or deformable materials in construction with an excavator or backhoe, etc.); and a robot arm can be replaced with any computer controlled actuatable system which can interact with its environment to manipulate a deformable material. The robot arm 110 includes sensor elements/modules such as stereo vision systems (SVS), 3D vision sensors (e.g., Microsoft Kinect™ or an Intel RealSense™), LIDAR sensors, audio sensors (e.g., microphones), inertial sensors (e.g., internal motion unit (IMU), torque sensor, weight sensor, etc.) for sensing aspects of the environment, including pose (i.e., X, Y, Z coordinates and roll, pitch, and yaw angles) of tools for the robot to mate, shape and volume of foodstuffs in ingredient containers, shape and volume of foodstuffs deposited into food assembly container, moving or static obstacles in the environment, etc.

To initiate an order, a patron in the patron area 120 enters an order 124 in an ordering station 122a-b, which is forwarded to a network 126. Alternatively, a patron on a mobile device 128 can, within or outside of the patron area 120, generate an optional order 132. Regardless of the source of the order, the network 126 forwards the order to a controller 114 of the robot arm 110. The controller generates a task plan 130 for the robot arm 110 to execute.

The task plan 130 includes a list of motion plans 132a-d for the robot arm 110 to execute. Each motion plan 132a-d is a plan for the robot arm 110 to engage with a respective utensil 108a-e, gather ingredients from the respective ingredient container 106a-d, and empty the utensil 108a-e in an appropriate location of a food assembly container 104 for the patron, which can be a plate, bowl, or other container. The robot arm 110 then returns the utensil 108a-e to its respective ingredient container 106a-d, the tool rack 109, or other location as determined by the task plan 130 or motion plan 132a-d, and releases the utensil 108a-d. The robot arm executes each motion plan 132a-d in a specified order, causing the food to be assembled within the food assembly container 104 in a planned and aesthetic manner.

Within the above environment, various of the above described problems can be solved. The environment 100 illustrated by FIG. 1 can improve food service to patrons by assembling meals faster, more accurately, and more sanitarily than a human can assemble a meal. Some of the problems described above can be solved in accordance with the disclosure below.

Due to the varying physical properties of foodstuffs, and techniques available to process them, the order of operations in food preparation matters. Sometimes the order of adding ingredients are specified in the recipe, and in other cases, especially if substitutions have occurred, a chef has to determine the correct order to add ingredients.

Even experienced chefs find it challenging to prepare a dish so that the food is presented in an artistic, appetizing, and aesthetic manner to the customer. Presentation of a meal has a significant impact on the customer's impression of taste of the food, and the amount of food that is consumed. Therefore, an autonomous system that arranges food in an organized and aesthetically pleasing manner can provide significant value for restaurants.

In an embodiment, the present disclosure enables a robotic food preparation system to combine and arrange ingredients in a neat and attractive manner to increase their palatability to consumers.

Accurately manipulating fracturable and deformable materials is challenging for both humans and automated systems such as robotic arms. Therefore, Applicant has developed systems and methods for overcoming certain problems in manipulating these fracturable and deformable materials. Embodiments of the present disclosure include a system that determines the appropriate sequence of actions and spatial relations between different materials to create the complete dish. In other words, Applicant's previous work may create a motion plan for manipulating an ingredient within its container and moving it to the customer's bowl or plate. The present disclosure includes a method for generating a task plan, having multiple motion plans therein, that accounts for manipulating multiple ingredients to cook an entire recipe as a whole.

Creating task plans for autonomous systems has been a field of research for many decades (e.g., Stanford Research Institute Problem Solver (STRIPS), Action Description Language (ADL), and Planning Domain Definition Language (PDDL). Recent work, such as "Integrated Task and Motion Planning in Belief Space" by Kaelbling et al., "Incremental Task and Motion Planning: A Constraint Based Approach" by Dantam et al., and "Combined Task and Motion Planning through an Extensible Planner-Independent Interface Layer" by Srivastava et al., combine task and motion planning to allow robots to reason about a goal configuration of the world and find a series of motion plans which result in transforming the current state of the world to the desired state. Classical planning is concerned with solving "planning problems over finite and discrete state spaces with a known initial state, deterministic actions, and goal states to be reached" (see, e.g., "Combined Task and Motion Planning as Classical AI Planning" by Ferrer-Mestres et al.)

However, these current approaches do not account for the deformable and dissociative nature of foods, which require additional motion planner complexity and thus additional task planner complexity to retrieve and assemble food into neat and attractive dishes.

The goal configuration for the recipe assembly planner describes a dish as a set of ingredients with allowed spatial distributions with geometric relationships to each other. One example configuration is:

a) a plate with a bed of brown rice pilaf spread 3-5 mm thick, in a circular distribution (e.g., 1 cm circularity tolerance zone), centered on the plate;
b) a piece of chicken (e.g., 100±g 10 g) centered in one quadrant (e.g., 5 mm tolerance);
c) servings of green peas (e.g., 50 g±3 g) and mashed potatoes (75 g±3 g) arranged symmetrically on the remaining plate space; and
d) a single sprig of rosemary centered on the mashed potatoes serving.

The distributions of the materials may be also specified in terms of mesh models to allow for specific spatial distributions (e.g., potatoes sculpted into a rose, espresso with patterns arranged in the milk foam at the top).

Given the goal state of a certain spatial distribution of material on the plate and in the bins, and the current world state (e.g., an empty plate or partially empty plate and material in the bins), the system of the present disclosure computes a series or sequence of motion plans which re-arrange a portion of the material from one or more bins into a distribution of the material on the plate designated in a recipe/plan. A goal world state is a goal state of the world, including the meal being prepared. The goal world state can also include the state of the materials used to create the meal and the tools used to create the meal. The current world state includes a current state of the meal being prepared (e.g., the ingredients in the meal preparation area, if any, and the distribution and order of those ingredients), the state of the meal preparation tools, and the state of the materials used to create the meal (e.g., how much of each ingredient is available, and the distribution of the remaining materials/ingredients).

The expected shape of the material in the containers is different every time because this class of materials (e.g., foodstuffs) change during manipulation. Before manipulation, the system measures the surface of the material in the bins and the target area for depositing the food using a structured light depth camera (e.g., radar, lidar, stereo vision, or RGB camera from which depth is inferred). The surface shape can be approximated from the raw data using a variety of averaging and median techniques. Applicant's method determines a plan for removal of a set quantity of material from a container, whenever the planner requires material to be in the utensil before placement. This method can also handle non-deformable materials (e.g., rigid foods such as an ice cream cone, hard-boiled egg, etc.).

Figure 2:
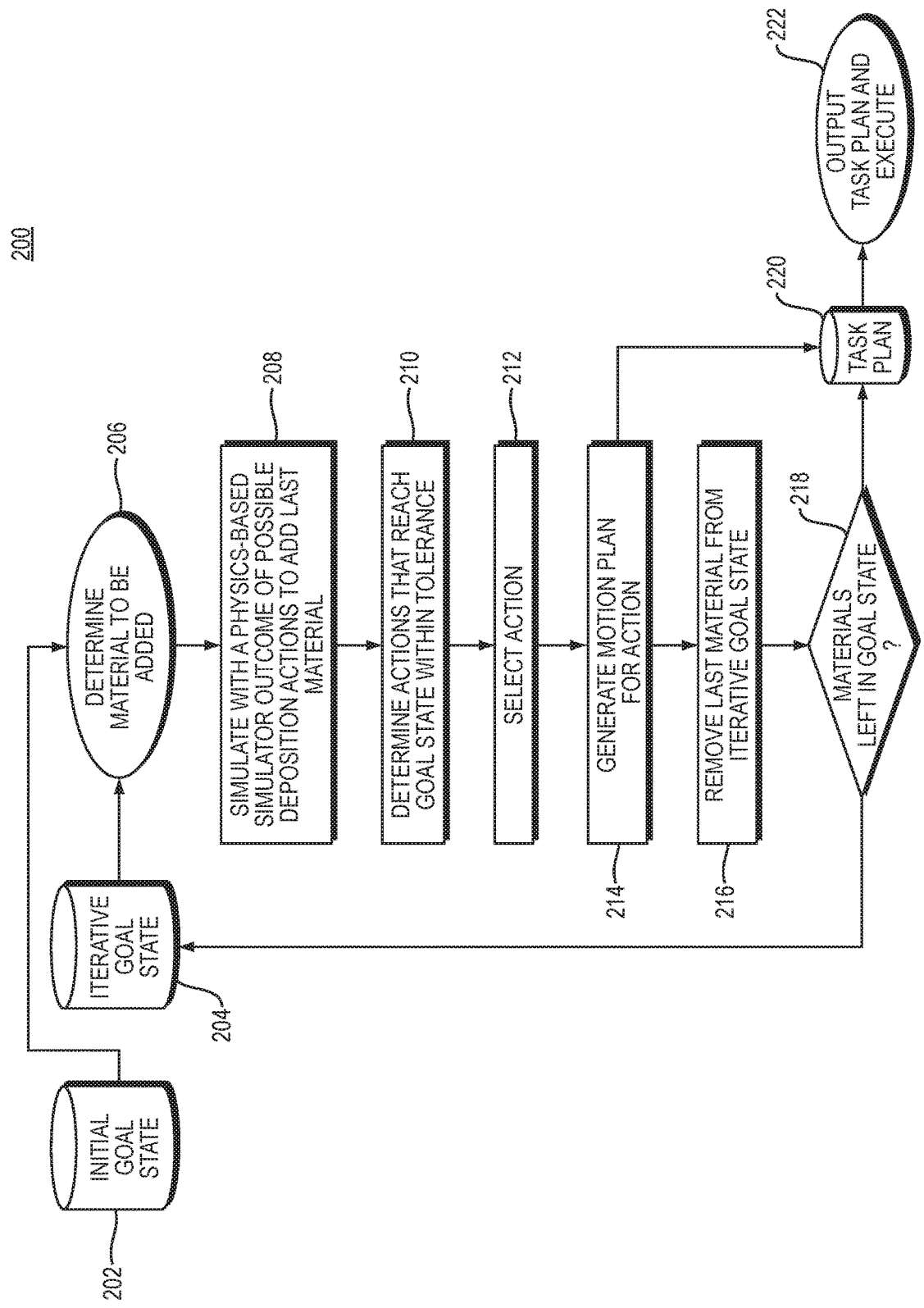
FIG. 2 is a flow diagram illustrating an example embodiment of Applicant's combined task and motion planner for deformable materials.

FIG. 2 is a flow diagram illustrating an example embodiment of Applicant's combined task and motion planner for deformable and fracturable materials.

First, a planning or designing user defines an initial "goal state" 202 as a spatial distribution of materials with spatial constraints which are specific to each material and their relation to other materials and the container. The material can be specified by one or more of a density, voxels, surface, or other distribution which encapsulates volume and mass of the material.

The "goal state" 202 may also be a continuous distribution of viable goal states, either in center of mass position and orientation; or a spatial region of allowed material. "goal state" 202 may also be a set of discrete, viable goal states.

Applicant's method then uses the principle of back-chaining. Optionally, applicant's method copies the initial goal state to an iterative goal state 204 variable. From the iterative goal state 204, the method applies spatial relations to all of the materials in the goal state to determine an order the materials are to be added (206). At this stage (206), only the material to be added needs to be determined, but embodiments can determine an order of more or all materials to be added as well. In the case of a tie, the tie can be broken with additional material specific constraints, or randomly (206).

Once the material is identified, the method samples actions from a set defined by a heuristic (e.g., utensil should have gravity vector pull the material out of the spoon with/without friction), and a physics-based simulator predicts the outcome of the action, with the state being a modified goal state without the material present (208). The action is performed by a tool to alter the observed state of the materials, with the goal creating the goal state. The action can be a granular action, such as changing a tool, rotating a mechanical arm, moving a mechanical arm, applying torque, scooping, tonging, or otherwise acquiring a material/ingredient, etc. A probabilistic distribution can be used, if the act of depositing the goal state is likely to have drastically changed the material. Further, this change can be estimated using another model.

From the set of actions which result in final distributions overlapping with the goal state distribution, within a tolerance, the method determines an action or a set of actions that have a best overlap with the goal state (210). The method interpolates between the actions and resamples if necessary. Once the method chooses a final action which achieves the goal state (212), the method finds a motion plan (e.g., scoop, tong) which achieves the state before dispensing (214). This motion plan is added to a task plan 220, which can be represented as a First-in-Last-Out (FILO) stack.

Then, the method repeats the above with the goal set being set as state used as the previous initial state (216). In other words, the task plan deletes the material to be added from the iterative goal state 204. If materials remain in the iterative goal state 204 (218), the method can repeat (206) based on the updated iterative goal state 204. From the iterative goal state 204, the method finds a motion plan to change tools to put the robot in the initial state for a next motion plan (206)-(214). These elements are repeated until the entire motion plan from the initial state to the goal state exists, or there are no materials left in the iterative goal state 204. (218). Upon the iterative goal state 204 being empty, the method outputs the task plan for execution (222).

Upon execution, after every motion, the method verifies that the current plan is still valid (e.g., current state of the world still matches that used in generating the initial task plan). If not, the method repeats the determination of steps given the current state of the world to find a new plan.

This approach differs from existing back-chaining and iterative sample-based motion planning because it employs a physics simulator, or an estimation of the effects of the action, to predict the final state of the material after the dispense action, and it further employs the deformable material motion planner to identify and get material from a container into the desired utensil.

The present disclosure includes several novel features and advantages over the current state of technology.

First, the method reasons how material moves once deposited with a forward physics simulation. In other embodiments, Applicant's disclosure includes employing sphere models having stickiness to determine depositing of food. In other embodiments, the Applicant's disclosure uses an estimator which determines the outcome of the action without performing a complete physics simulation and uses this approximation to plan future actions. In yet other embodiments, these actions may be determined by a neural net which is another form of estimator to approximate the behavior of the physical world.

Second, non-deformable foods are modeled as rigid objects. In other embodiments, the method can reason about how material changes when the tool is moved through it. Other embodiments can employ spheres with stickiness or models thereof to allow re-sculpting like a CNC machine or additive manufacture.

Third, Applicant's method considers the problem an inverse problem because it determines the order of materials to be added, and begins with the material to be added. To solve this inverse problem, Applicant's method can employ a search over possible actions, use a generic method to sample possible actions, or use optimization-based methods to solve for the order of materials to be added and the actions to take to add them.

Fourth, the method employs active perception to measure the state of the world and update world state in-between actions.

Fifth, the method employs a state-action model with a physics-based simulation to convert example action to distribution. The method uses a goal state description having tolerance limits which allows finding of plans.

Embodiments of the present disclosure employ a sensing apparatus (e.g., a camera/depth sensor such as a Microsoft Kinect™ or Intel RealSense™), an articulated robot arm, and a set of end effectors which can manipulate the chosen materials (e.g. a utensil such as a spoon, ladle, or pair of tongs). Each end effector utensil can be attached and detached from the robot arm by the robot, and the utensils should be stored in accordance with food safety requirements (e.g., ServSafe), as further detailed in U.S. patent application Ser. No. 16/570,915 titled "Locating And Attaching Interchangeable Tools In-Situ".

The apparatus also uses a serving surface where the final container may be placed to deposit and arrange the food. The apparatus also may use additional mixing containers, preparation surfaces, and container holders (e.g., a single arm may require the container to be placed in a fixture which keeps it in place during manipulation).

The depth camera (material height/orientation sensing system) determines the current state of the world for the scooping controller. The integrated task and motion planner computes a series of trajectories which result in extraction of the desired ingredients, and placement of them in the required containers, in the proper order, and possibly performing additional operations on subsets of the materials before the final combination step into a completed meal. The robot executes the motions plans, which the scooping controller and task planner monitors and corrects the trajectory as it happens (closed loop behavior) or evaluates the result only at the end of each trajectory or the entire plan (open loop).

In embodiments where the recipe is constant and the order of the materials does not change, then a simple state-machine is sufficient to combine the materials. For example, to make a bowl of pasta with pasta sauce, first place a 200 g portion of pasta in the bowl (+/−1 cm on center) using tongs, then switch tools from tongs to ladle, then place a 100 g portion of pasta sauce on the pasta (+/−1 cm on center of container, 2+/−1 cm above the max height of the pasta). This recipe, and more complicated variants that might apply garnishes, etc., does not require an integrated task and motion planner because no feedback based on the pasta pose in the container is being applied to the placement of the sauce. However, more complicated recipes which can have myriad permutations based on customer orders do need such advanced task and motion planning.

Many recipe preparation solutions employ bins, chutes, funnels and rely on gravity to move the material from one container to another and to combine them in containers to create a final dish. These systems employ mechanical methods to implement a state machine and do not allow for unique combinations or arrangements of materials. Instead, all end products are identical in these methods. In contrast, Applicant's system allows for every dish to use a unique recipe.

Currently, other solutions have used natural language processing to parse recipes and create STRIPS-style action plans, but these solutions do not have the rich geometric information which is often required to modify these plans for successful execution, and further cannot determine a plan for a recipe that is not pre-made by a human. For example, a current system uses pre-defined primitive actions (e.g., mix, pour, scrape, bake) and predefined locations (e.g., oven, counter, cookie-sheet) and matched existing recipes to this exact set of actions. In contrast, Applicant's method explicitly reasons about the desired geometric distribution of each ingredient before creating our plan instead of exactly repeating the listed recipe.

Learned controllers are growing in popularity. To date, different final distributions of material have been created, but only for a single ingredient. See Levine et al., "Learning Robotic Manipulation of Granular Media."

Since assembling a meal is typically challenging, typically, human labor is used instead.

Applicant's approach applies integrated task and motion planning to deformable materials. Previous work reasoned about locations of rigid objects in the world (e.g., world-state) and possibly probability distributions of the location of those objects (e.g., belief-space). Instead, Applicant's disclosure explicitly reasons about the spatial distribution of the material, and possibly a probability distribution of the spatial distribution of the material. This approach can use a variety of low-level motion planners (e.g., constraint-based, sampling-based, or learned) to perform the low-level motion plans for the robot. Applicant's motion planner is able to create plans which result in the desired material distribution.

Applicant's disclosure provides the advantage of being able to autonomously manipulate and arrange deformable materials in a pleasing and attractive manner. This is not available as a generic solution with arbitrary initial arrangements of the material and varying goal-state configurations (e.g., different dishes). Applicant's approach can generalize to multiple materials with different physical properties and different utensils, which none of the previous approaches are able to do.

This approach is planned to be combined with a closed loop control which monitors the change of the material during the manipulation and reacts to it in real-time. The method for recomputing trajectories during execution can be different than that used to generate them.

Figure 3:
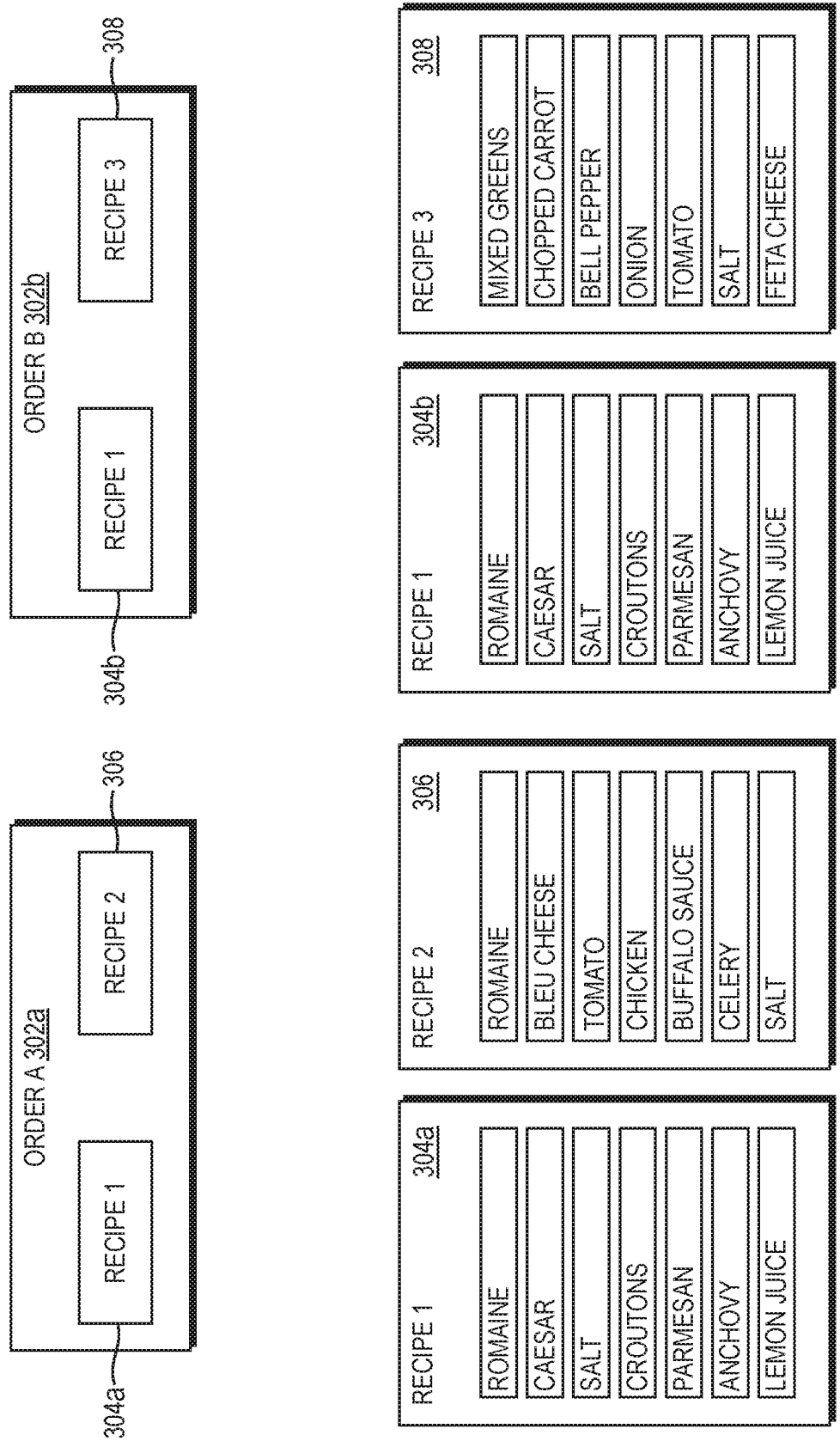
FIG. 3 is a diagram illustrating an example embodiment of multiple orders having multiple recipes.

FIG. 3 is a diagram 300 illustrating an example embodiment of multiple orders 302a-b having multiple recipes 304a-b, 306, 308. Recipes 1 304a and 304b are the same recipe, but separate entities that exist in different orders. Recipe 2 306 and Recipe 3 308 are different recipes in order A 302a and order B 302b.

Each respective recipe 304a-b, 306, and 308 has a respective ingredients list, which are also illustrated by FIG. 3. A person having ordinary skill in the art can recognize that common ingredients exist in many of the recipes. For example, every recipe has salt as an ingredient, three of the recipes have romaine, etc. Therefore, to optimize the creation of the orders 302a-b collectively, it would be beneficial to identify duplicative steps in following each recipe and parallelize those steps.

Figure 4:
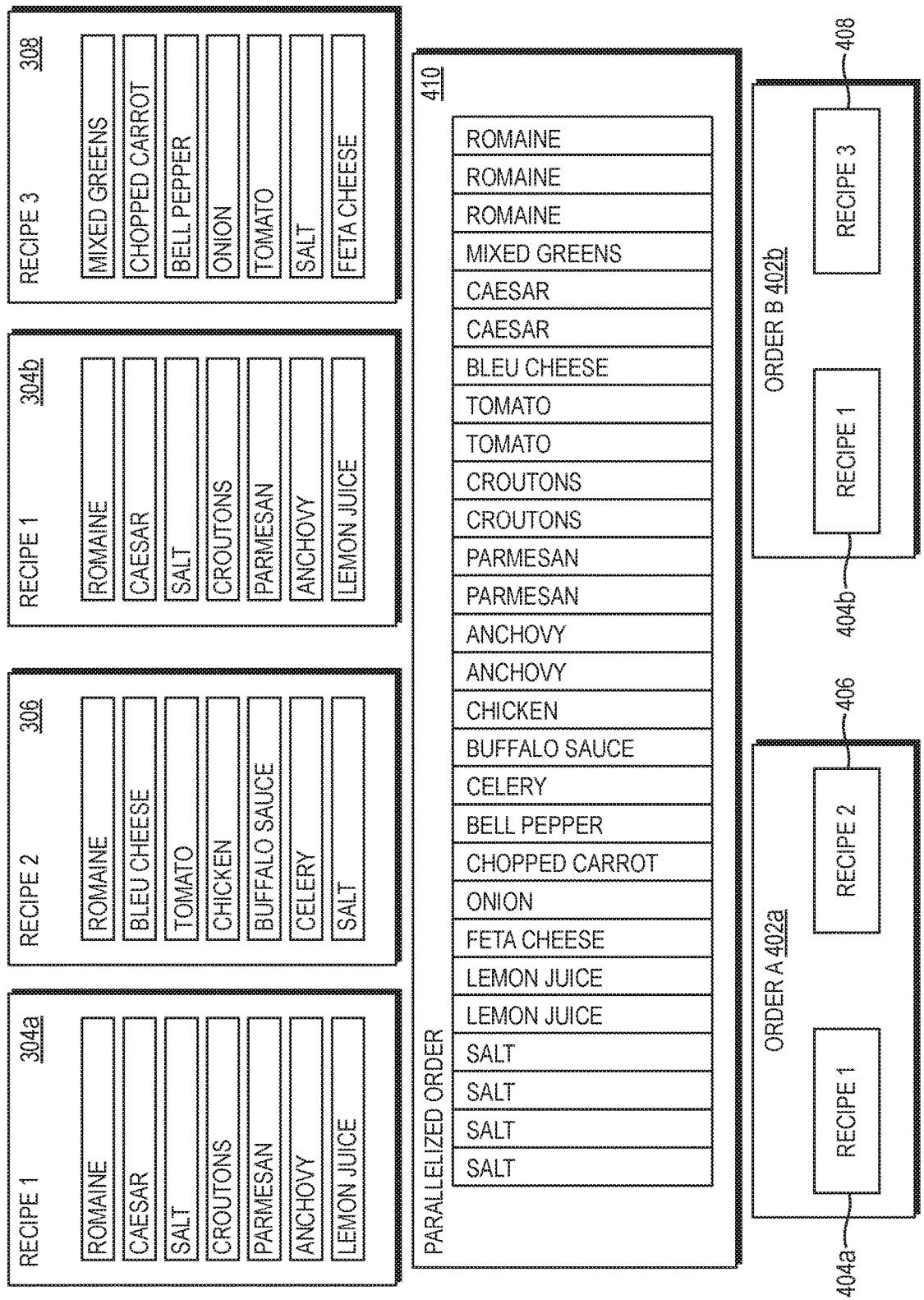
FIG. 4 is a diagram illustrating an example embodiment of such an optimization.

FIG. 4 is a diagram 400 illustrating an example embodiment of such an optimization. Recipes 1-3 404a-b, 406, and 408 correspond to the recipes 304a-b, 306, and 308 of FIG. 3. FIG. 4 further illustrates a parallelized order 410 that optimizes the assembly of all of the ingredients. The parallelized order 410 begins with three entries of romaine, for orders 404a-b and 406. Other ingredients of the same type are also grouped together, such as Caesar dressing, tomato, parmesan, anchovy, lemon juice, and salt.

By grouping like ingredients together for multiple orders, robots can save time by not having to switch utensils for each ingredient in each recipe, and can remove the time it would take to switch tools from the time it takes to create a meal. Further, for some ingredients, the amount required to fulfill all of the order(s) can be grabbed from the ingredient bin, and portioned out in each meal container. This additionally saves time by preventing the robotic system from moving between the food preparation area and ingredients area unnecessarily.

A person having ordinary skill in the art can recognize that multiple factors can go into generating the parallelized order 410, including:
  a) Duplicative ingredients across multiple orders
  b) Consolidating steps using a same utensil across multiple recipes/orders
  c) Availability of multiple robot arms in the food preparation area
  d) Considering food allergies or restrictions
  e) Consolidating non-ingredient steps, such as mixing, heating, etc.

Figure 5:
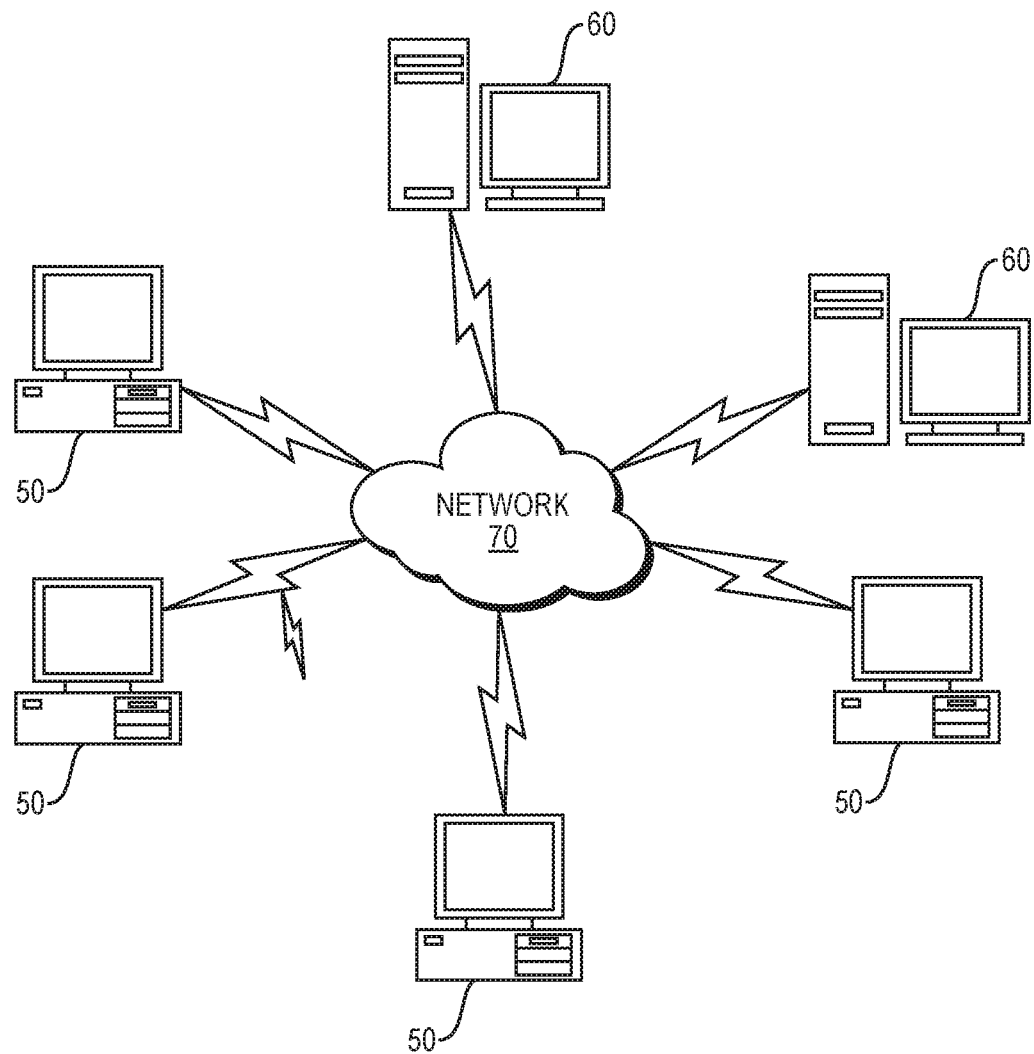
FIG. 5 illustrates a computer network or similar digital processing environment in which embodiments of the present invention may be implemented.

FIG. 5 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 6:
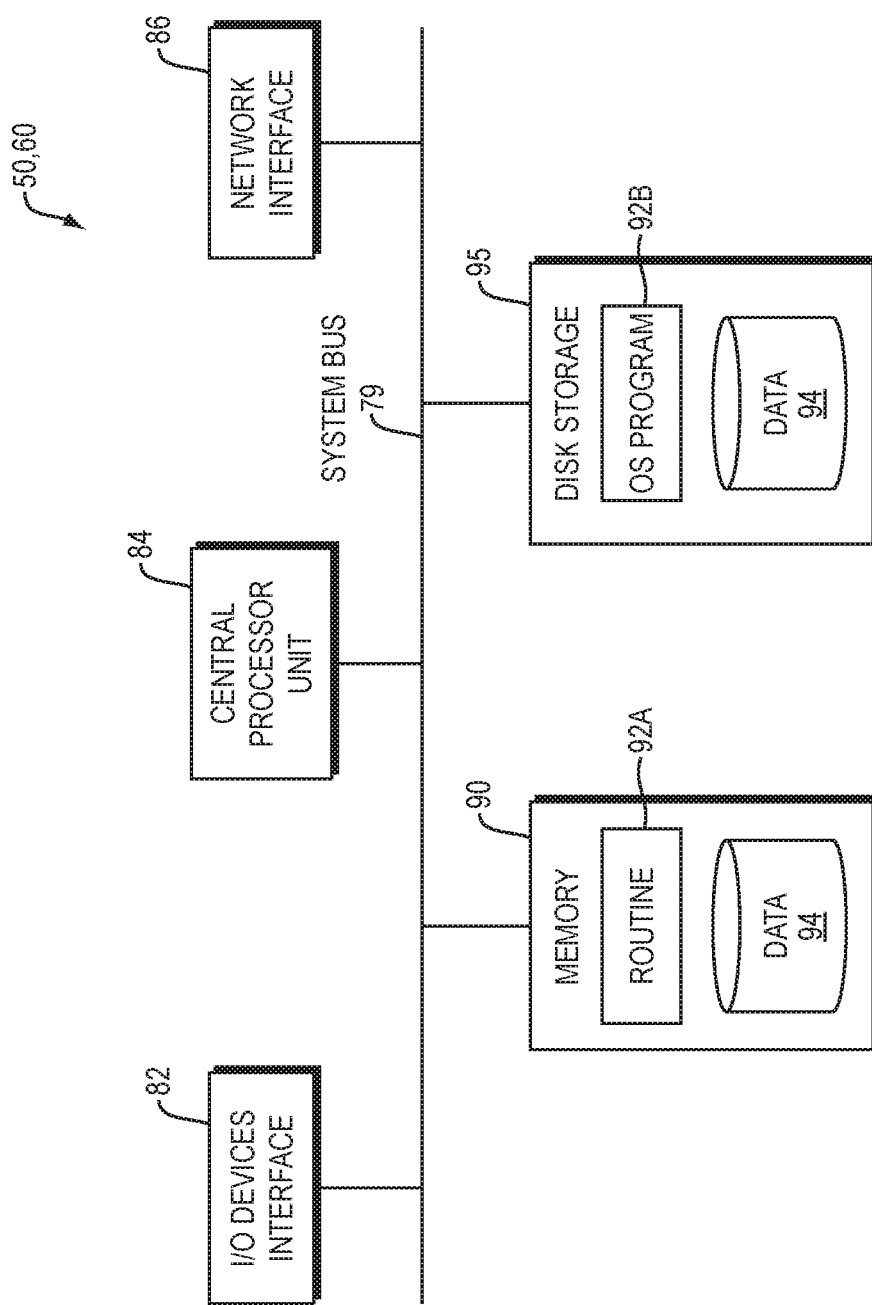
FIG. 6 is a diagram of an example internal structure of a computer (e.g., client processor/device or server computers) in the computer system of FIG. 5.

FIG. 6 is a diagram of an example internal structure of a computer (e.g., client processor/device 50 or server computers 60) in the computer system of FIG. 5. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions 92 and data 94 used to implement an embodiment of the present invention (e.g., robotic arm module, parallelization module, and recipe module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method comprising:
   determining a given material to manipulate with an end effector of one or more autonomous robots to achieve a goal state, the goal state being one or more deformable or granular materials in a geometric distribution;
   for the given material, simulating a respective simulated geometric distribution for each of a plurality of candidate actions performed by the end effector of the one or more autonomous robots to manipulate the given material;
   selecting a given action of the candidate actions based on the respective simulated geometric distribution of the selected given action having a closest geometric distribution of the goal state;
   based on the selected given action, generating a first motion plan for the one or more autonomous robots to execute the selected given action; and
   executing the first motion plan using the one or more autonomous robots.

2. The method of claim 1, further comprising:
   creating a new goal state having the given material manipulated;
   determining a new given material to manipulate to achieve a new goal state, the new goal state being one or more deformable or granular materials including the given material in a particular arrangement;
   for the new given material, simulating a respective simulated geometric distribution for each of a plurality of new candidate actions to manipulate the new given material;
   selecting a given new action of the new candidate actions based on the respective simulated geometric distribution of the new given action having a closest geometric distribution of the new goal state; and
   based on the new selected given action, generating a second motion plan for the new selected given action.

3. The method of claim 2, further comprising:
   ordering, for execution, the first motion plan and second motion plan based on one or more rules, wherein the rules include one or more of material based rules, ease of assembly rules, and parallelization rules, said ordering resulting in an order.

4. The method of claim 3, further comprising:
   executing the first motion plan and second motion plan in the order using one or more autonomous robots.

5. The method of claim 4, wherein a first autonomous robot of the one or more autonomous robots executes the first motion plan and a second autonomous robot of the one or more autonomous robots executes the second motion plan.

6. The method of claim 3, wherein ordering is based on at least one of:
   one or more instructions of ingredients or actions;
   a set of material rules;
   predicted based on a physics-based model, and
   a heuristic.

7. The method of claim 1, wherein determining a given action of the candidate actions includes one or more of:
   adding the given material to the goal state;
   removing a given material from an existing state; and
   performing a process step to the given material and one or more other materials.

8. A system comprising:
   a processor; and
   a memory with computer code instructions stored thereon, the processor and the memory, with the computer code instructions, being configured to cause the system to:
   determine a given material to manipulate with an end effector of one or more autonomous robots to achieve a goal state, the goal state being one or more deformable or granular materials in a geometric distribution;

for the given material, simulate a respective simulated geometric distribution for each of a plurality of candidate actions performed by the end effector of the one or more autonomous robots to manipulate the given material;

selecting a given action of the candidate actions based on the respective simulated geometric distribution of the selected given action having a closest geometric distribution of the goal state;

based on the selected given action of the given one or more actions, generate a first motion plan for the one or more autonomous robots to execute selected action; and executing the first motion plan using one or more autonomous robots.

9. The system of claim 8, wherein the instructions further cause the processor to:

create a new goal state having the given material manipulated;

determine a new given material to manipulate to achieve a new goal state, the new goal state being one or more deformable or granular materials including the given material in a particular arrangement;

for the new given material, simulate, with a physics-based simulator, a respective simulated geometric distribution of new candidate actions to manipulate the new given material;

select a given new action of the candidate actions based on the respective simulated geometric distribution of the given new action reaching the new goal state;

based on a new selected action, generate a second motion plan for the new selected action.

10. The system of claim 9, wherein the instructions further cause the processor to:

order, for execution, the first motion plan and second motion plan based on one or more rules, wherein the rules include one or more of material based rules, ease of assembly rules, and parallelization rules, said ordering resulting in an order.

11. The system of claim 10, wherein the instructions further cause the processor to:

execute the first motion plan and second motion plan in the order using one or more autonomous robots.

12. The system of claim 11, wherein a first autonomous of the one or more autonomous robot executes the first motion plan and a second autonomous robot of the one or more autonomous robots executes the second motion plan.

13. The system of claim 10, wherein ordering is based on one or more instructions of ingredients or actions.

14. The system of claim 8, wherein determining a given action of the candidate actions includes one or more of:

adding the given material to the goal state; and performing a process step to the given material and one or more other materials.

* * * * *